(12) United States Patent  
Strode et al.

(10) Patent No.: US 11,385,774 B2
(45) Date of Patent: Jul. 12, 2022

(54) INTUITIVE WORKSPACE MANAGEMENT (71) Applicant: Red Hat, Inc., Raleigh, NC (US)

(72) Inventors: Maureen Emily Strode, Cambridge, MA (US); Ryan John Lerch, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 577 days.

(21) Appl. No.: 14/147,640

(22) Filed: Jan. 6, 2014

(65) Prior Publication Data

US 2015/0193100 A1    Jul. 9, 2015

(51) Int. Cl.
G06F 3/0484 (2022.01)
G06F 3/04817 (2022.01)
G06F 3/0481 (2022.01)

(52) U.S. Cl.
CPC .......... *G06F 3/0484* (2013.01); *G06F 3/0481* (2013.01); *G06F 3/04817* (2013.01); *G06F 2203/04803* (2013.01)

(58) Field of Classification Search
CPC .......... G06F 3/04842; G06F 17/30115; G06F 17/30126; G06F 17/30554; G06F 17/3089; G06F 3/04817; G06F 3/0481; G06F 3/04845; G06F 3/04815; G06F 3/011; G06F 2203/04803; G06F 3/0482; G06F 1/1647; G06F 3/048; G06F 9/4445; G06F 3/0488; G06F 21/6218; G06F 21/629; G06F 3/041; G06F 17/30011; G06F 17/2705; G06F 17/30864; G06F 17/3053; G06F 17/30598; G06F 17/30896; G06F 17/211; G06F 17/22; G06F 17/3026; G06F 16/951; G06F 16/245; G06F 16/248; G06F 16/93; G06F 16/9535; G06F 16/48; G06F 16/24575; G06F 3/0486; G06F 11/3684; G06F 16/173; G06F 16/2322; G06F 16/24578; G06F 17/218; G06F 11/368; G06F 16/14;
(Continued)

(56) References Cited

U.S. PATENT DOCUMENTS 5,072,412 A * 12/1991 Henderson, Jr ...... G06F 3/0481
715/788
5,159,669 A * 10/1992 Trigg ..................... G06F 16/94
715/814

(Continued)

OTHER PUBLICATIONS

"Cinnamon 1.6 Released" http://cinnamon.linuxmint.com/?p=207, Sep. 18, 2012, 40 pages.

(Continued)

Primary Examiner — Michael Roswell
(74) Attorney, Agent, or Firm — Haynes and Boone, LLP (57) ABSTRACT A method performed by a computer processing system includes associating a first workspace with a first graphical object of a workspace widget, the workspace widget being provided to a user through a graphical user interface (GUI). The method further includes receiving an input from a user to switch to a second workspace, providing the second workspace to the user through the GUI, moving the first graphical object from a first position in the workspace widget to a second position in the workspace widget, adding a second graphical object to the workspace widget at the first position, the second graphical object being associated with the second workspace.

17 Claims, 8 Drawing Sheets (58) Field of Classification Search
CPC ............ G06F 16/2329; G06F 16/2358; G06F 16/2455; G06F 16/9038; G06F 3/0484; G06F 11/1464; G06F 12/084; G06F 16/144; G06F 16/2228; G06F 16/23; G06F 16/2308; G06F 16/2365; H04N 21/2353; H04L 41/22; H04L 51/046; H04L 51/10; H04L 63/102; H04L 67/2847
See application file for complete search history.

(56) References Cited

U.S. PATENT DOCUMENTS

| | | | | |
|---|---|---|---|---|
| 5,359,703 A * | | 10/1994 | Robertson | G06F 3/04815 345/419 |
| 5,394,521 A * | | 2/1995 | Henderson, Jr | G06F 3/0481 715/804 |
| 5,604,861 A * | | 2/1997 | Douglas | G06F 3/0483 715/776 |
| 5,608,850 A * | | 3/1997 | Robertson | G06F 3/04815 345/427 |
| 5,640,498 A * | | 6/1997 | Chew | G06F 3/0481 715/790 |
| 5,920,316 A * | | 7/1999 | Oran | G06F 3/0482 715/779 |
| 6,028,604 A * | | 2/2000 | Matthews, III | G06F 3/0481 715/821 |
| 6,230,159 B1 * | | 5/2001 | Golde | G06F 9/4433 |
| 6,239,798 B1 * | | 5/2001 | Ludolph | G06F 3/0481 715/788 |
| 6,549,217 B1 * | | 4/2003 | De Greef | G06F 9/44505 715/745 |
| 6,671,855 B1 * | | 12/2003 | Hayashi | G06Q 10/10 715/234 |
| 6,983,227 B1 * | | 1/2006 | Thalhammer-Reyero | G05B 17/02 703/2 |
| 7,124,373 B1 * | | 10/2006 | Patil | G06F 3/0486 715/779 |
| 7,143,100 B2 * | | 11/2006 | Carlson | G06F 3/0481 |
| 7,370,065 B1 * | | 5/2008 | Rys | G06F 16/10 715/764 |
| 7,373,592 B2 * | | 5/2008 | Allyn | G06F 3/0481 715/211 |
| 7,580,551 B1 * | | 8/2009 | Srihari | G06K 9/00161 340/5.52 |
| 7,590,945 B2 * | | 9/2009 | Sims | H04L 29/06027 713/189 |
| 7,703,036 B2 * | | 4/2010 | Satterfield | G06F 3/0481 715/255 |
| 7,814,426 B2 * | | 10/2010 | Huesken | G06F 9/465 715/741 |
| 7,886,048 B1 * | | 2/2011 | Holland | H04L 67/22 704/277 |
| 7,954,064 B2 * | | 5/2011 | Forstall | G06F 3/04817 715/765 |
| 8,108,494 B1 * | | 1/2012 | Holland | H04L 67/22 709/204 |
| 8,156,090 B1 * | | 4/2012 | Curles | G06F 16/164 707/694 |
| 8,214,747 B1 * | | 7/2012 | Yankovich | G06F 9/4451 715/751 |
| 8,612,862 B2 * | | 12/2013 | Mascarenhas | H04L 67/36 715/734 |
| 8,650,210 B1 * | | 2/2014 | Cheng | G06F 17/30864 707/707 |
| 8,730,269 B2 * | | 5/2014 | Pinto | G06F 1/1694 345/672 |
| 8,793,292 B1 * | | 7/2014 | Mannepalli | G05B 19/41885 703/18 |
| 9,003,325 B2 * | | 4/2015 | Jitkoff | G06F 3/0481 715/790 |
| 9,098,500 B1 * | | 8/2015 | Asokan | G06F 17/30309 |
| 9,122,678 B2 * | | 9/2015 | Wong | G06F 16/3347 |
| 9,280,320 B2 * | | 3/2016 | Howard | G06F 8/36 |
| 9,298,355 B1 * | | 3/2016 | Beausoleil | H04L 12/1822 |
| 9,348,802 B2 * | | 5/2016 | Massand | G06F 40/166 |
| 9,354,767 B2 * | | 5/2016 | Cruz Moreno | G06F 3/0481 |
| 9,384,285 B1 * | | 7/2016 | Ding | G06F 16/9535 |
| 9,405,459 B2 * | | 8/2016 | Sirpal | G06F 3/0488 |
| 9,424,347 B2 * | | 8/2016 | Burman | G06F 40/10 |
| 9,448,815 B2 * | | 9/2016 | Pahlavan | G06F 3/1462 |
| 9,542,080 B2 * | | 1/2017 | Beveridge | G06F 3/0484 |
| 9,542,164 B1 * | | 1/2017 | Mosterman | G06F 8/71 |
| 9,619,116 B2 * | | 4/2017 | Dukhon | G06F 3/0484 |
| 10,062,045 B2 * | | 8/2018 | Brown | G06Q 10/103 |
| 10,255,047 B2 * | | 4/2019 | Alexander | G06F 8/33 |
| 2001/0035882 A1 * | | 11/2001 | Stoakley | G06F 3/0481 715/779 |
| 2002/0038387 A1 * | | 3/2002 | Fuiks | G06F 9/44505 719/313 |
| 2002/0065848 A1 * | | 5/2002 | Walker | G06F 17/24 715/205 |
| 2002/0078069 A1 * | | 6/2002 | Moore | G06F 17/30067 |
| 2002/0138582 A1 * | | 9/2002 | Chandra | G06Q 10/10 709/206 |
| 2002/0149615 A1 * | | 10/2002 | Rajarajan | G06F 9/451 715/738 |
| 2003/0007000 A1 * | | 1/2003 | Carlson | G06F 3/0481 715/713 |
| 2003/0046441 A1 * | | 3/2003 | Rau | G06F 8/71 719/315 |
| 2003/0135565 A1 * | | 7/2003 | Estrada | G06Q 10/10 709/206 |
| 2003/0142953 A1 * | | 7/2003 | Terada | G11B 27/329 386/241 |
| 2003/0144868 A1 * | | 7/2003 | MacIntyre | G06F 17/30536 705/7.38 |
| 2003/0179234 A1 * | | 9/2003 | Nelson | G06T 11/206 715/764 |
| 2003/0179237 A1 * | | 9/2003 | Nelson | G06F 3/0483 715/765 |
| 2003/0189597 A1 * | | 10/2003 | Anderson | G06F 3/0481 715/778 |
| 2003/0229849 A1 * | | 12/2003 | Wendt | G06F 16/958 715/223 |
| 2004/0135812 A1 * | | 7/2004 | Tai | G06F 9/4443 715/779 |
| 2005/0104880 A1 * | | 5/2005 | Kawahara | G06F 3/04815 345/419 |
| 2005/0149428 A1 * | | 7/2005 | Gooch | G06Q 40/04 705/37 |
| 2005/0172242 A1 * | | 8/2005 | Vienneau | G06F 8/38 715/801 |
| 2006/0020904 A1 * | | 1/2006 | Aaltonen | G06F 3/048 715/850 |
| 2006/0026235 A1 * | | 2/2006 | Schwarz | G06Q 10/10 709/205 |
| 2006/0085422 A1 * | | 4/2006 | Moyaux | G06F 17/30893 |
| 2006/0161861 A1 * | | 7/2006 | Holecek | G06F 3/0481 715/782 |
| 2006/0195298 A1 * | | 8/2006 | Ishizuka | G01R 31/2834 702/187 |
| 2006/0224989 A1 * | | 10/2006 | Pettiross | G06F 3/0481 715/779 |
| 2006/0277229 A1 * | | 12/2006 | Yoshida | G06F 16/93 |
| 2007/0124373 A1 * | | 5/2007 | Chatterjee | G06Q 10/10 709/204 |
| 2007/0150525 A1 * | | 6/2007 | Idicula | G06F 16/1873 |
| 2007/0157099 A1 * | | 7/2007 | Haug | G06F 3/0486 715/769 |
| 2007/0157155 A1 * | | 7/2007 | Peters | G06F 8/10 717/100 |
| 2007/0168340 A1 * | | 7/2007 | Mahoney | G06F 17/30873 |
| 2007/0200913 A1 * | | 8/2007 | Lefebure | H04N 1/00244 348/14.01 |
| 2007/0255712 A1 * | | 11/2007 | Mahoney | G06F 17/30194 |
| 2008/0141161 A1 * | | 6/2008 | Raven | G06F 3/0483 715/777 |

(56) References Cited

U.S. PATENT DOCUMENTS

| | | | |
|---|---|---|---|
| 2008/0148189 A1* | 6/2008 | Szent-Miklosy | G06F 3/0481 715/848 |
| 2008/0177994 A1* | 7/2008 | Mayer | G06F 9/4418 713/2 |
| 2008/0244444 A1 | 10/2008 | Bauman et al. | |
| 2009/0006568 A1* | 1/2009 | Messenger | G06Q 10/107 709/206 |
| 2009/0006936 A1* | 1/2009 | Parker | G06F 40/166 715/200 |
| 2009/0013043 A1* | 1/2009 | Tan | G06Q 10/107 709/205 |
| 2009/0019426 A1* | 1/2009 | Baeumer | G06F 8/71 717/122 |
| 2009/0070404 A1* | 3/2009 | Mazzaferri | G06F 9/542 709/202 |
| 2009/0089682 A1* | 4/2009 | Baier | G06Q 10/10 715/751 |
| 2009/0187853 A1* | 7/2009 | Noyes | G06F 3/0481 715/802 |
| 2009/0254406 A1* | 10/2009 | Sichart | G06Q 10/06 705/7.23 |
| 2009/0307605 A1* | 12/2009 | Ryan | G06Q 10/10 715/751 |
| 2010/0106748 A1* | 4/2010 | Schultz | H04L 43/00 707/803 |
| 2010/0153865 A1* | 6/2010 | Barnes | G06F 9/4443 715/762 |
| 2010/0180210 A1* | 7/2010 | Toyama | G06F 3/038 715/750 |
| 2010/0299176 A1* | 11/2010 | Mangipudi | G06Q 10/06316 705/7.26 |
| 2011/0035685 A1* | 2/2011 | Johanson | H04N 7/15 715/753 |
| 2011/0078624 A1* | 3/2011 | Missig | G06F 3/04883 715/802 |
| 2011/0087982 A1* | 4/2011 | McCann | G06F 3/0481 715/769 |
| 2011/0138314 A1* | 6/2011 | Mir | G06F 9/4445 715/779 |
| 2011/0214090 A1* | 9/2011 | Yee | G06Q 10/10 715/838 |
| 2011/0246904 A1* | 10/2011 | Pinto | G06F 9/4445 715/740 |
| 2011/0246950 A1* | 10/2011 | Luna | G06F 3/04815 715/848 |
| 2012/0005269 A1* | 1/2012 | Janssen | G06F 3/0481 709/203 |
| 2012/0023223 A1* | 1/2012 | Branch | G06F 9/4856 709/224 |
| 2012/0042025 A1* | 2/2012 | Jamison | G06Q 10/107 709/206 |
| 2012/0066223 A1* | 3/2012 | Schentrup | G06F 9/4451 707/737 |
| 2012/0084713 A1* | 4/2012 | Desai | G06F 9/4445 715/788 |
| 2012/0096365 A1* | 4/2012 | Wilkinson | G06F 9/468 715/740 |
| 2012/0096389 A1 | 4/2012 | Flam et al. | |
| 2012/0096395 A1* | 4/2012 | Ording | G06F 9/4443 715/790 |
| 2012/0096396 A1* | 4/2012 | Ording | G06F 9/4443 715/799 |
| 2012/0096397 A1* | 4/2012 | Ording | G06F 3/04883 715/802 |
| 2012/0096408 A1 | 4/2012 | Boss et al. | |
| 2012/0110483 A1* | 5/2012 | Arcese | G06F 3/04817 715/768 |
| 2012/0124079 A1* | 5/2012 | Kinsella | G06F 16/164 707/769 |
| 2012/0151377 A1* | 6/2012 | Schultz | G06Q 10/103 715/751 |
| 2012/0174020 A1* | 7/2012 | Bell | G06F 3/0481 715/779 |
| 2012/0198358 A1* | 8/2012 | Carrer | H04L 51/32 715/753 |
| 2012/0221687 A1* | 8/2012 | Hunter | G06F 17/30029 709/219 |
| 2012/0246596 A1* | 9/2012 | Ording | G06F 3/0481 715/799 |
| 2012/0271748 A1* | 10/2012 | DiSalvo | G06Q 40/04 705/37 |
| 2012/0303666 A1 | 11/2012 | Freed | |
| 2012/0311501 A1* | 12/2012 | Nonez | G06F 3/04817 715/838 |
| 2013/0061035 A1* | 3/2013 | Hook | H04L 9/088 713/150 |
| 2013/0061335 A1* | 3/2013 | Schwabe | G06F 21/6218 726/28 |
| 2013/0097115 A1* | 4/2013 | Savage | G06F 17/30014 707/610 |
| 2013/0167072 A1* | 6/2013 | Ari | G06F 3/0481 715/790 |
| 2013/0167073 A1* | 6/2013 | Ari | G06F 3/0481 715/798 |
| 2013/0179801 A1* | 7/2013 | Audet | G06F 9/4443 715/752 |
| 2013/0205239 A1* | 8/2013 | Holland | G06F 9/4443 715/766 |
| 2013/0238510 A1* | 9/2013 | Wieboldt | G06Q 10/103 705/301 |
| 2013/0282792 A1* | 10/2013 | Graham | G06F 9/4445 709/203 |
| 2013/0298140 A1* | 11/2013 | Wolfe | G06F 9/542 719/319 |
| 2013/0318593 A1* | 11/2013 | Smith | H04L 63/08 726/9 |
| 2013/0325913 A1* | 12/2013 | Kusaka | G06F 11/3438 707/826 |
| 2014/0164989 A1* | 6/2014 | Kuhne | G06F 3/0488 715/790 |
| 2014/0249833 A1* | 9/2014 | Conti | G06Q 10/06316 705/2 |
| 2015/0154413 A1* | 6/2015 | Digirolamo | G06F 21/6218 726/30 |
| 2015/0200945 A1* | 7/2015 | Edson | G06F 16/00 726/28 |
| 2015/0363733 A1* | 12/2015 | Brown | G06Q 10/06316 705/7.26 |
| 2016/0004741 A1* | 1/2016 | Johnson | G06Q 50/16 707/609 |
| 2016/0334967 A1* | 11/2016 | Rottler | G06Q 10/10 |
| 2016/0335323 A1* | 11/2016 | Teodorescu | H04L 67/2833 |
| 2017/0153886 A1* | 6/2017 | Singh | G06F 8/70 |
| 2019/0228360 A1* | 7/2019 | Aoyama | G05B 19/418 |

OTHER PUBLICATIONS

Steven Houben et al., "Co-Activity Manager: Integrating Activity-Based Collaboration into the Desktop Interface" http://itu.dk/people/shou/pubs/camAVI2012.pdf, May 21-25, 2012, 4 pages.

"Saving Workspaces" http://ubuntuforums.org/showthread.php?t=1277326, Sep. 28, 2009, 4 pages.

"Save Workbooks in an Arranged Workspace" http://office.microsoft.com/en-in/excel-help/save-workbooks-in-an-arranged-workspace-HP010250051.aspx, 1 page.

"Oracle® Solaris 11 User's Guide for the GNOME Desktop" http://docs.oracle.com/cd/E23824_01/pdf/E24676.pdf, Dec. 2011, 152 pages.

Stephen Voida et al., "Re-Framing the Desktop Interface Around the Activities of Knowledge Work" http://dl.acm.org/citation.cfm?id=1449751, 2008, 2 pages.

\* cited by examiner

FIG. 6 ately for the user. For example, one type of GUI is a graphical desktop environment. One feature of a graphical desktop environment is the concept of a workspace. A workspace is an environment in which a user can open various applications and documents and position the windows for those applications and documents across the workspace. For example, a workspace may correspond to the screen space on a monitor. A user can open various applications, such as a word processing application and an email client application. The user may then move and position the windows corresponding to those applications as desired. Some GUIs allow a user to save a particular workspace and reopen that workspace at a later time.

INTUITIVE WORKSPACE MANAGEMENT

BACKGROUND

The present disclosure relates generally to Graphical User Interfaces (GUIs), and more particularly, to workspace management within GUIs.

GUIs, which provide users with a way to interact with computing devices, often include many features to provide an intuitive experience for the user. For example, one type of GUI is a graphical desktop environment. One feature of a graphical desktop environment is the concept of a workspace. A workspace is an environment in which a user can open various applications and documents and position the windows for those applications and documents across the workspace. For example, a workspace may correspond to the screen space on a monitor. A user can open various applications, such as a word processing application and an email client application. The user may then move and position the windows corresponding to those applications as desired. Some GUIs allow a user to save a particular workspace and reopen that workspace at a later time.

Some graphical desktop environments provide a user with multiple workspaces. In such systems, a user typically sets up each workspace manually. Specifically, the user may have a finite set of workspaces which he or she may switch between as desired. The user typically has to manually set up each of the workspaces before working. While working, the user may decide to make adjustments to the workspaces as needed.

In some cases, to assist with switching between multiple workspaces, an interactive graphical object, sometimes referred to as a widget, is provided. The widget may include a number of objects within, each object representing a different workspace. The user can thus readily switch between the workspaces by interacting with the objects within the widget.

In some examples, a user may choose not to set up any workspaces beforehand. Rather, the user will start working, and as additional workspace is desired, the user will then create the new workspaces. This has to be done manually and can often interrupt the user's workflow. Accordingly, an intuitive mechanism for workspace management within a GUI is desired.

SUMMARY

According to certain illustrative examples, a method performed by a computer processing system includes associating a first workspace with a first graphical object of a workspace widget, the workspace widget being provided to a user through a graphical user interface (GUI). The method further includes receiving an input from a user to switch to a second workspace, providing the second workspace to the user through the GUI, moving the first graphical object from a first position in the workspace widget to a second position in the workspace widget, adding a second graphical object to the workspace widget at the first position, the second graphical object being associated with the second workspace.

According to certain illustrative examples, a method for workspace management, the method performed by a computer processing system, includes associating a first workspace with a first graphical object of a vertical workspace widget, the workspace widget being provided to a user through a graphical user interface (GUI), receiving an input from a user to save a state of the first workspace, the state including a set of open applications within the workspace, the state further including files associated with the open applications, providing a second workspace to the user through the GUI, moving the first graphical object from a first position in the workspace widget to a second position in the workspace widget, the second position being below the first position, adding a second graphical object to the workspace widget, the second graphical object being at the first position, the second graphical object being associated with the second workspace.

According to certain illustrative examples, a non-transitory machine-readable medium comprising machine readable instructions that when executed by one or more processors of a computing system, cause the one or more processors to associate a first workspace with a first graphical object of a workspace widget, the workspace widget being provided to a user through a graphical user interface (GUI), receive an input from a user to save a state of the first workspace, provide a second workspace to the user through the GUI, move the first graphical object from a first position in the workspace widget to a second position in the workspace widget, add a second graphical object to the workspace widget at the first position, the second graphical object being associated with the second workspace.

In the figures, elements having the same designations may have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As discussed above, an intuitive mechanism for workspace management within a GUI is desired. According to one example of principles described herein, a GUI includes an intuitive method for workspace management. Specifically, a user is provided with a workspace environment. If the user decides that he or she would like to work with a new workspace, the user can use a "save workspace" feature, or something similar, that saves the current workspace as is.

The user is also provided with a workspace-switching object such as a workspace widget. The workspace widget may display the number of active workspaces available to the user. In one example, the workspace widget may display the workspaces as a vertical stack with the oldest workspace at the bottom and the newest workspace at the top. When the user saves the current workspace, the graphical object within the workspace widget that represents that workspace is pushed down on the stack. A new graphical object within the workspace widget that represents the new workspace is then displayed on top of the stack. The user then has a new workspace with which to work.

The stack of graphical objects within the workspace widget is similar to files on a real desktop workspace. For example, a user may finish working with papers within a physical file folder and stack that file on the desk. The user can then spread out additional papers to work on over the recently-cleared desktop workspace. Again, if the user wishes to clear the workspace and put all of those papers into a file folder, the user can stack the new file folder onto the old file folder. Thus, in modeling these real desktop workspace interactions, the workspace widget provides an intuitive means for a user to manage his or her workspaces in a computing context.

Figure 1A:
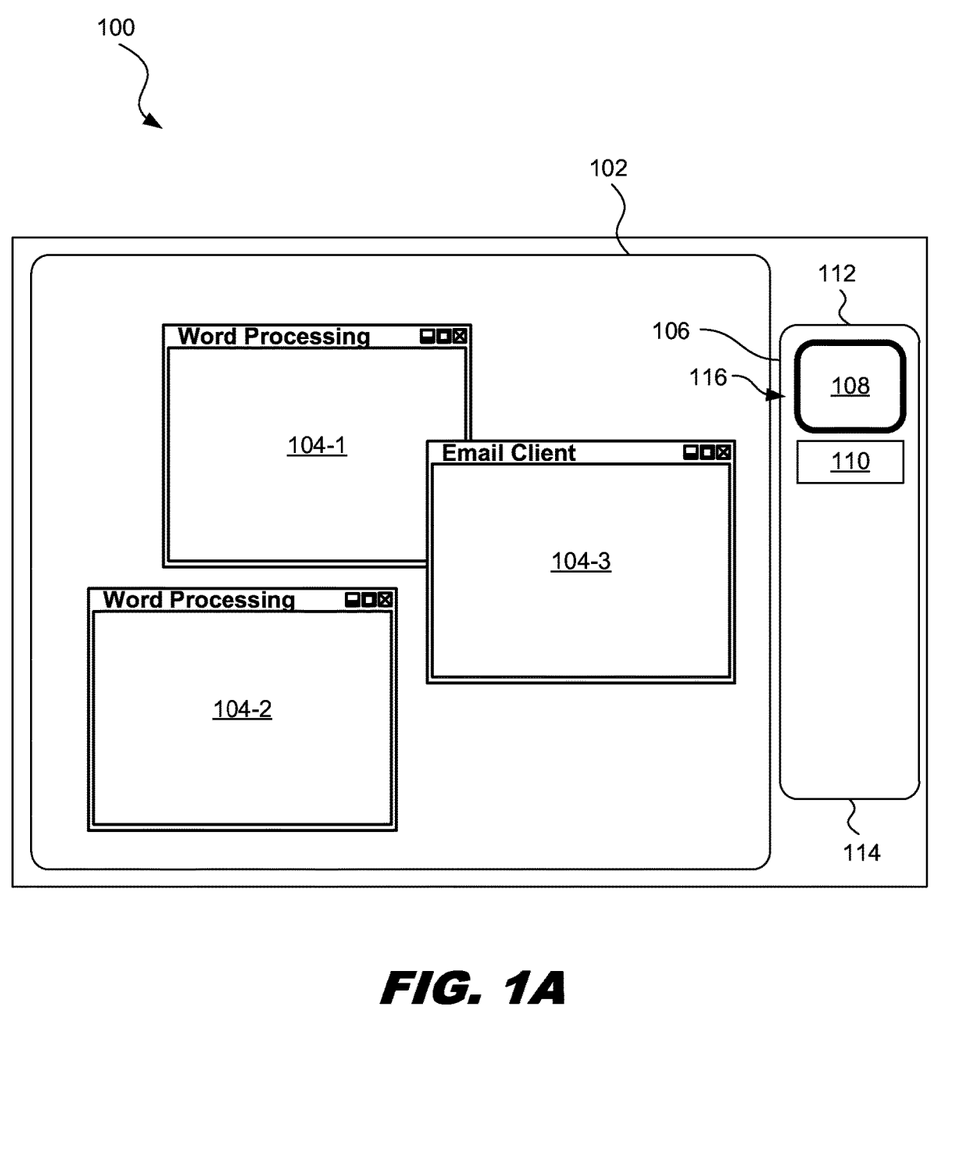
FIG. 1A is a diagram showing an illustrative workspace of a GUI, according to one example of principles described herein.

FIG. 1A is a diagram showing an illustrative workspace 102 of a GUI 100. According to the present example, a GUI 100 provides a user with a workspace environment 102. The workspace 102 may have a number of open applications 104. Additionally, the GUI 100 includes a workspace-switching object 106, which will be referred to as a workspace widget 106. The workspace widget 106 includes a number of graphical objects 108 representing workspaces and a mechanism 110 for saving the current workspace.

The GUI 100 may be one of many types of GUIs. For example, the GUI may be provided to a user through a standard desktop computer. In such an example, the GUI 100 is displayed to the user through a monitor or other display device. The user may use one of a number of different input tools, such as a mouse, touchscreen, touchpad, or track-pad to provide input to the GUI 100. In some examples, the GUI 100 may be provided on a laptop computer, a tablet computing device, or a mobile computing device.

The workspace 102 represents a user's present working space within the GUI 100. In some examples, an operating system may include a GUI 100 that provides a user with multiple workspaces. In some examples, an application that is separate from the operating system may provide the user with multiple workspaces. Each workspace 102 can be used to group various applications and files with which a user is working. Having multiple workspaces allows a user to better organize his or her work and operate more efficiently. In this example, the workspace 102 provides a user with a number of open applications 104.

The open applications 104 may be provided to a user in a manner that is consistent with the underlying operating system of the computing system supporting the GUI 100. For example, many operating systems display different applications within different windows or boxes. In the illustrated example, the user has an email client application 104-3 and two word processing applications 104-1, 104-2 open.

In one example, a user may be working on a project that involves information contained within an email, which is accessed through the email client 104-3. Additionally, the project may also involve two word processing files, which are accessed through the word processing application instances 104-1, 104-2. In some cases, however, a user may want to put this project on hold and start a new project. The desire for a new workspace may not have been present when the user initially started the current project. Rather, the desire for a new workspace may have come from an email asking the user to get another project done as soon as possible. Using traditional methods, the user would have to manually create a new workspace and set up whatever applications he or she desires for the new project on the new workspace.

As mentioned above, a GUI 100 that provides a user with the option of multiple workspaces will typically include some type of widget 106 that allows the user to switch between multiple workspaces. The workspace widget 106 includes a number of graphical objects 108 that represent the workspaces that are currently available to the user. In this example, the workspace widget 106 includes only a first graphical object 108 that represents the present workspace 102. This graphical object 108 is placed at the top 112 of the vertical workspace widget 106 in a first position 116.

The graphical object 108 may represent the workspace 102 in a variety of manners. In one example, the graphical object 108 may include text that presents the name of the current workspace 102. This may be either an automatically generated name or a user-defined name. In some examples, the graphical object 108 may display a thumbnail image of the present workspace 102 as it currently appears. In further examples, the graphical object 108 may display a symbol, a time-stamp of the last update to that workspace 102, or any other helpful information for a user.

As mentioned above, using a traditional workspace system provides a user with a mechanism to add a new workspace. The new workspace is then represented as a new graphical object placed below the first graphical object 108. Using principles described herein, however, a user is provided with a mechanism 110 to save the present workspace 102. The graphical object 108 representing the present workspace 102 will then be pushed down towards the bottom 114 of the vertical workspace widget 114. As will be described in further detail below, a new graphical object representing the new workspace will then be placed at the top of the workspace widget 106.

The mechanism 110 may be activated in a variety of manners. In the illustrated example, the mechanism is provided as a button 110 placed below the graphical object 108. The button may display text such as "Save Present Workspace" or something similar that indicates to a user the function of the button 110. The button 110 may also include a symbol such as a plus sign indicating that engaging the button 110 will add a new workspace. The button 110 may be activated in a manner consistent with the system that supports the GUI 100. For example, in a desktop computer environment, a user may use a mouse or touchpad to move a cursor over the button 110. The user may then click on the button 110 to create the new workspace.

In some examples, a user may indicate that he or she wishes to save the workspace through other means. For example, a user may use hand gestures if the system providing the workspaces accepts such input. The system may also accept voice commands that indicate that the user wishes to save the current workspace and start working with a new workspace. In some examples, there may be a keyboard shortcut that saves the workspace. For example, the user might simultaneously press the control key and the up or down arrow keys to switch between workspaces.

In some examples, the save workspace button 110 may be referred to as a new workspace button. Thus, the user does not think of saving the workspace. Rather, the user simply adds a new workspace while the saving of the state of the previous workspace is all done transparently to the user.

In some examples, the save workspace button 110 may be placed at other locations besides below the graphical object 108 as illustrated. For example, in some cases the save workspace button 110 may be placed at the top 112 of the workspace widget 106. In some examples, the save workspace button 110 may be located outside of the workspace widget 106.

Figure 1B:
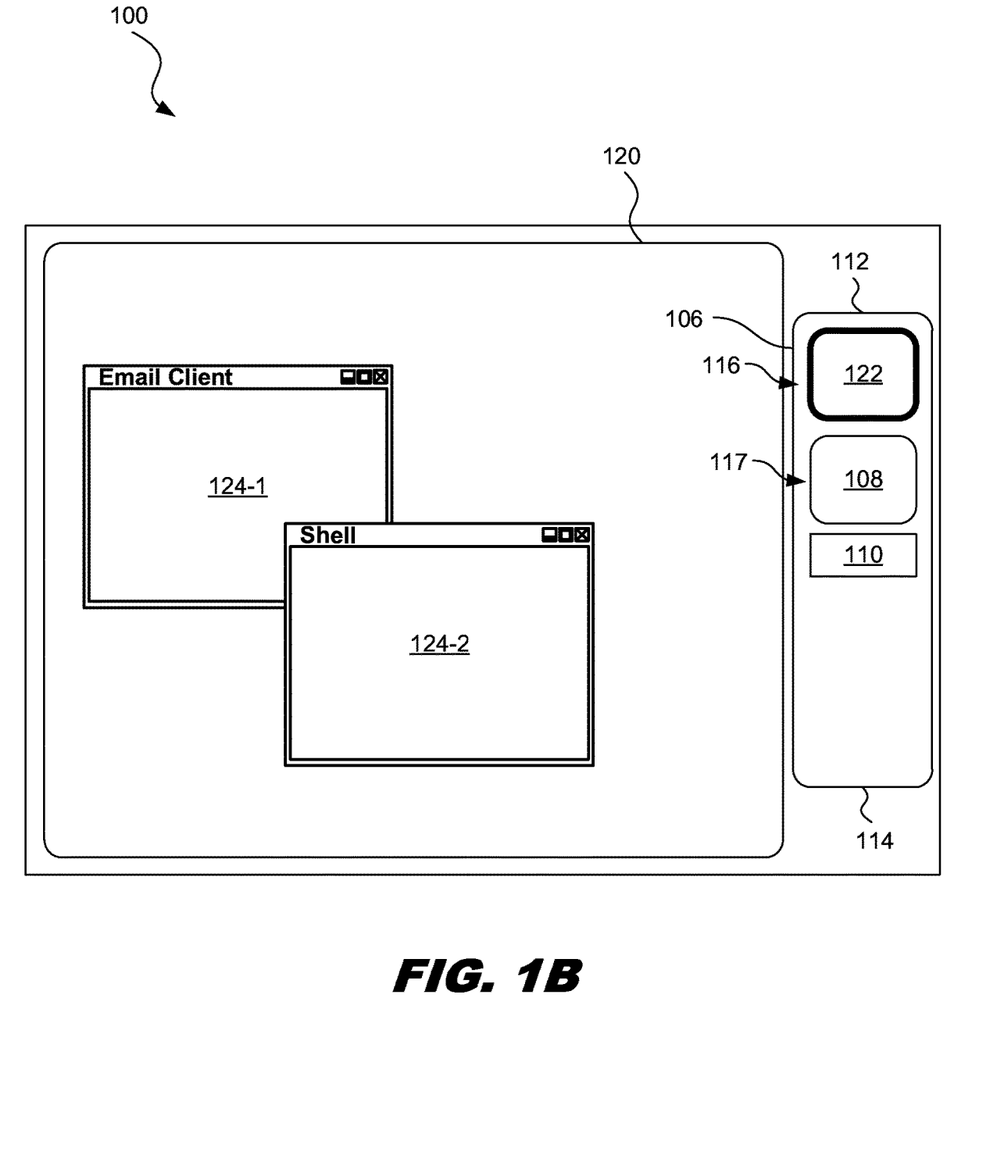
FIG. 1B is a diagram showing an illustrative second workspace of the GUI, according to one example of principles described herein.

FIG. 1B is a diagram showing an illustrative new workspace 120 of the GUI 100. As described above, when the user clicks on the save workspace button 110, a new graphical object 122 appears within the workspace widget 106. The original graphical object 108 that represents the original workspace 102, is then moved down on the workspace widget 106. Specifically, the first graphical object 108 is moved from the first position 116 to a second position 117. The new graphical object 122 then appears at the first position 116.

A user may wish to open a new workspace 122 for a variety of reasons. For example, as described above, a user may want to put the present project on hold and start a new project. According to the present example, the new workspace 120 may start as a blank workspace. The user may then open any applications that he or she desires to use with this new workspace 120. For example, for the new project associated with the new workspace 120, the user may also open an email client application 124-1. The user may also open a shell application 124-2 to work on writing software code.

Using principles described herein, a user does not have to manually create workspaces beforehand. Rather, the user can add new workspaces as desired. Moreover, the workspaces are presented to the user in an intuitive manner through the workspace widget 106. Specifically, the newest workspace is positioned at the top 112 of the workspace widget 106 while the oldest workspace is positioned at the bottom 114 of the workspace widget 106. This simulates a real environment where the oldest file would be positioned at the bottom of the stack while the newest file would be positioned at the top of the stack.

Each workspace available to the user is represented as a graphical object 108, 122, within the workspace widget 106. Thus, as new workspaces are created, new graphical objects appear within the workspace widget 106. The user may interact with the workspace widget 106 to switch between the active workspaces. For example, the user may click on the graphical objects 108, 122 representing the available workspaces 102, 120 and switch between those workspaces 102, 120 as desired.

The new graphical object 122 may be presented to the user in a manner similar to the first graphical object 108. For example the new graphical object 122 may be displayed as text or symbols. The new graphical object 122 may also be presented as a thumbnail image of the present workspace 120.

According to certain illustrative examples, when a user creates a new workspace, the current workspace will be saved and pushed down on the stack of graphical objects within the workspace widget 106. The user may then be prompted to provide a name for the saved workspace. In some cases, however, the name of the saved workspace may be auto-generated. The user may then still have the option of manually changing the auto-generated name.

The auto-generated name for the saved workspace may be done in a variety of manners. In one example, the name may be generated based on the open applications 124 within the workspace 122. In this example, if the user were to click on the save workspace button 110 to save the present workspace 122, the suggested name may be "email+shell" because the email client and the shell application are the open applications within the workspace.

In some examples, the auto-generated name may be based on a history of workspace names provided by the user. For example, if a user historically names workspaces with a specific set of applications or files in a particular manner, the system can learn that pattern. Then, when the user saves a workspace using a similar set of applications or files, the historically used name may then be automatically generated for the user. The user may then have the option to overwrite that name with a different name. The system that learns the user's historical preference for name may then be accordingly updated.

In a further example, the automatically generated name for a workspace may be based on the file location of files opened by applications within the workspace. For example, if a user is using multiple applications, each opening files from a specific file location, then the automatically generated name may correspond to the file location where all those files are stored. In a specific example, the user may be working on files from a folder that is named "Project ABC." The automatically generated name may thus be "Project ABC."

In a further example, the automatic name generation may be based on a category associated with the open applications. For example, if a user has open on the workspace a number of photo-editing applications and digital photo files, then the automatically generated name may be something similar to "Photo-editing." Again, the user may have the option of overwriting the automatically generated name. Other methods of auto-name generation may be used in accordance with principles described herein.

Figure 1C:
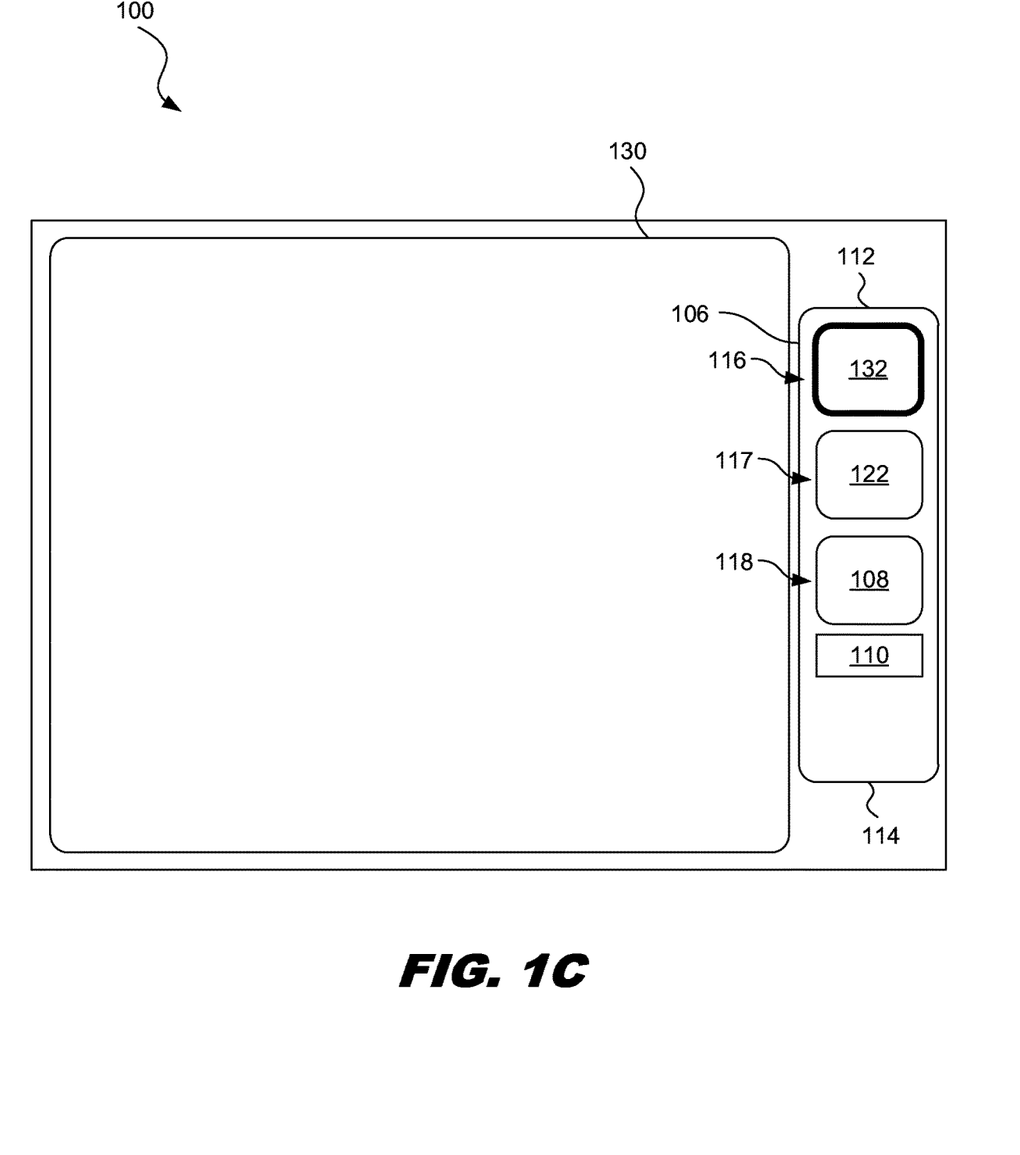
FIG. 1C is a diagram showing an illustrative additional new workspace of the GUI, according to one example of principles described herein.

FIG. 1C is a diagram showing an illustrative additional new workspace 130 of the GUI 100. FIG. 1C illustrates an additional example of saving a new workspace. According to the present example a user saves the previous workspace 120 and adds a new workspace 130. Thus, the graphical objects 108, 122 representing the first workspace 102 and the second workspace 120 are pushed down on the workspace widget 106. Specifically, the first graphical object 108 is moved from the second position 117 to a third position 118. The second graphical object 122 is moved from the first position 116 to the second position 117. Finally, a new graphical object 132 representing the new workspace 130 is displayed to the user in the first position 116.

As mentioned above, a new workspace may be blank when first presented to a user. In some examples, a user may set a new workspace default. Thus, when a user creates a new desktop, a predefined set of applications may be automatically opened for the user. For example, a user may wish to have the email client open in all workspaces, regardless of the project. The user may then set a default so that all new workspaces include the email client already opened. In some cases, the default new workspace may match the present workspace that was recently saved.

In some examples, there may be various workspace profiles. This may allow a user to have multiple default workspaces for different scenarios. For example, for a communication profile, the new desktop may automatically include an email client, a chat client, and a voice over internet protocol (VOIP) client. In one example, for a software development profile, various applications related to writing code may be automatically provided with that default workspace. A user may select which default profile should be used when the new workspace is first opened up.

Figure 2:
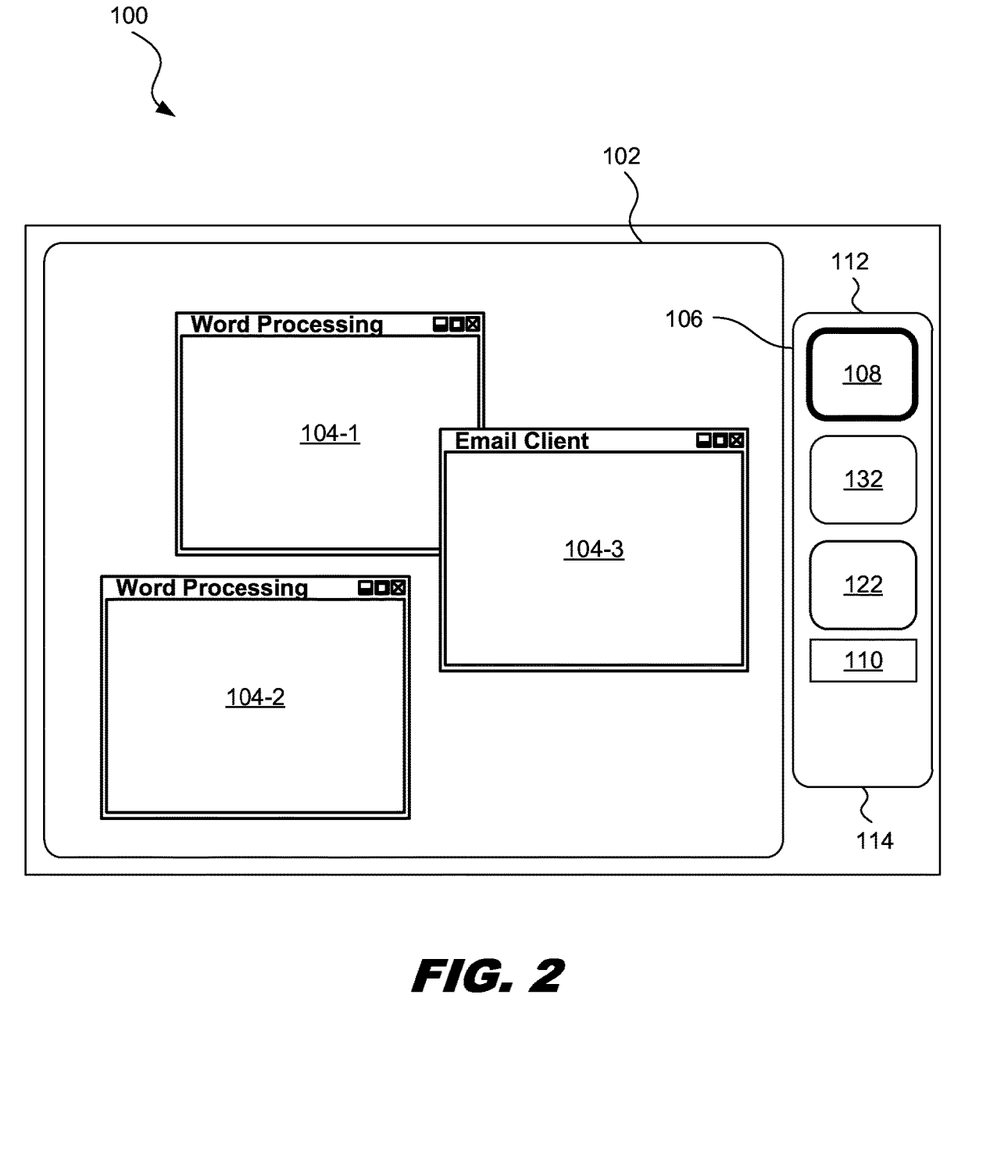
FIG. 2 is a diagram showing an illustrative reopened original workspace of the GUI, according to one example of principles described herein.

FIG. 2 is a diagram showing an illustrative reopened original workspace 102 of the GUI 100. According to the present example, a user may use the workspace widget 106 to easily switch between workspaces. Thus, the user can reopen an earlier saved workspace by using the workspace widget 106. The reopened workspace 102 may be presented to the user exactly as it was when the user saved the workspace 102.

In one example, when a user reopens a workspace 102, the graphical object 108 within the workspace widget 106 that represents the reopened workspace 102 may stay at the bottom 114. Additionally, the nature of the graphical object may change in order to indicate to the user which of the workspaces represented by the graphical objects 108, 122, 132 is currently being displayed. In the illustrated example, the graphical object 108 corresponding to the displayed workspace 102 is highlighted with a thicker border. In some examples, the selected graphical object may be shaded differently, faded, or be modified in a number of other ways that indicate to the user which of the graphical objects 108, 122, 132 corresponds to the displayed workspace.

In some examples, if a user reopens an earlier saved workspace, then the graphical object representing that workspace is moved back up to the top of the vertical workspace widget 106. Thus, the displayed workspace will always correspond to the graphical object closest to the top 112 of the workspace widget 106. This is similar to a real world situation where a user has a stack of files on his or her desk. If a user picks up an older file towards the bottom of the stack in order to work on that file, the file moves to the top of the stack. Thus, a more intuitive user experience is provided.

Figure 3:
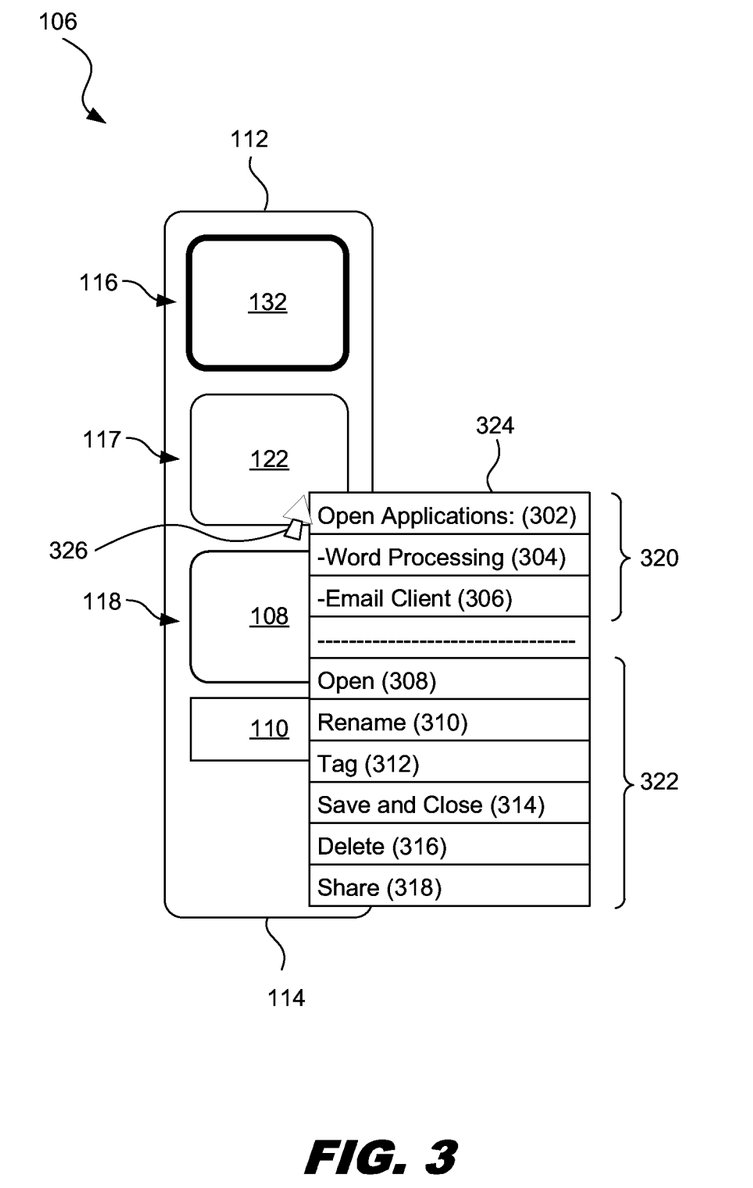
FIG. 3 is a diagram showing an illustrative vertical workspace widget, according to one example of principles described herein.

FIG. 3 is a diagram showing an illustrative workspace widget 106. According to certain illustrative examples, the workspace widget 106 can provide several tools for managing workspaces to a user. For example, a user may move a cursor 326 over the graphical objects 108, 122, 132 representing the open workspaces. The user may then open a menu 324 that provides a number of options associated with a particular workspace. Specifically, the user may be provided with information 320 and available actions 322.

The menu 324 may be opened in a variety of manners. In one example, the menu 324 may open when the user moves, or hovers, the cursor 326 over a graphical object 122 representing a workspace. In some examples, a user may click on the graphical object 122 to open the menu 324. In some examples, only the information portion 320 of the menu 324 may appear when the cursor 326 hovers over the graphical object 122 and the action portion 322 of the menu 324 opens when the user clicks on the graphical object 122. In some examples, a particular key on the keyboard may be used to bring up information about the workspace associated with the graphical object 122.

The information portion 320 of the menu 314 may provide the user with a list of the open applications 302 within the workspace (120, FIG. 1) corresponding to the selected graphical object 122. For example, the information portion 320 of the menu 324 may list the word processing application 304 and the email client 306 application. In some examples, the information portion 320 may also list any files associated with the open applications 302. For example, if a user is working on word processing file entitled "File XYZ," then that file name will be displayed along with the word processing application 304.

The information portion 320 may also provide a user with a means to move instances of an application from one workspace to another. For example, when the user creates a new workspace, he or she may wish to have some of the same applications that were in the previous workspace within the new workspace. Specifically, if the user wishes to have the email client application 306 in the new workspace, he or she may click on the email client application within the information portion 320 of the menu and drag it to the graphical object 132 representing the present workspace. A new instance of the email client application 306 will then appear in the new workspace (130, FIG. 1).

The information provided in the information portion 320 is not limited to what is illustrated and described herein. Other pieces of information that may be relevant to a user may also be provided. For example, the information portion may provide a time and date for the last time the corresponding workspace was opened.

The menu 324 can also provide the user with a number of actions associated with the selected graphical object 122. In the illustrated example, the selected graphical object 122 represents a workspace that is not the currently opened workspace. Thus, the user may have the option to open 308 the workspace. As described above, this provides the previously saved workspace (120. FIG. 1) to the user, thus allowing the user to continue a project associated with that workspace.

The user may also have the option to rename 310 the workspace. As described above, the workspace may have an auto-generated name. It may be the case that the user does not like the auto-generated name and wishes to provide a new one. Alternatively, it may be that in some cases, the user has changed his or her mind about the previously given name and wishes to provide a new name.

In some examples, a user may have the option to tag 312 a workspace. Tags may be used for a variety of purposes. In one example, a user may tag 312 a workspace based on the people associated with the project of that workspace. For example, if a user is working on a project with a specific co-worker or for a specific supervisor, then the user may tag all workspaces associated with projects being performed with or for that co-worker or supervisor. Tagging can allow for easier searching at a later time. Specifically, a user can search for all workspaces with a particular tag. This can be helpful if the user has opened dozens of workspaces. If the user has tagged all projects being worked on with a specific co-worker with that co-workers name, then the user can easily find workspaces associated with that co-worker by searching for the given tag.

In some examples, the user may have the option to save and close 314 a particular workspace. This may be done if the user does not intend to do any work on the project associated with the corresponding workspace for a substantial period of time. The user may also wish to not have the corresponding graphical object 122 within the workspace widget 106 anymore as well. Thus, the save and close 314 option allows the user to remove the graphical object 122 from the workspace widget but bring it back at a later time if desired.

In some cases, a user may be entirely done with a project associated with a workspace. In this case, the user can simply remove that workspace by using the delete 316 option on the corresponding graphical object 122. This will remove the workspace associated with the graphical object 122 permanently.

In some examples, a user may wish to share a particular workspace 318 with another user. For example, a co-worker may be working on the project associated with a particular workspace. The user may wish to share the workspace with the co-worker to facilitate completion of the project. When the user uses the share function 318 in the menu 324, the workspace may be made available to another user of a different computer system. This may be done over a computer network.

Figure 4:
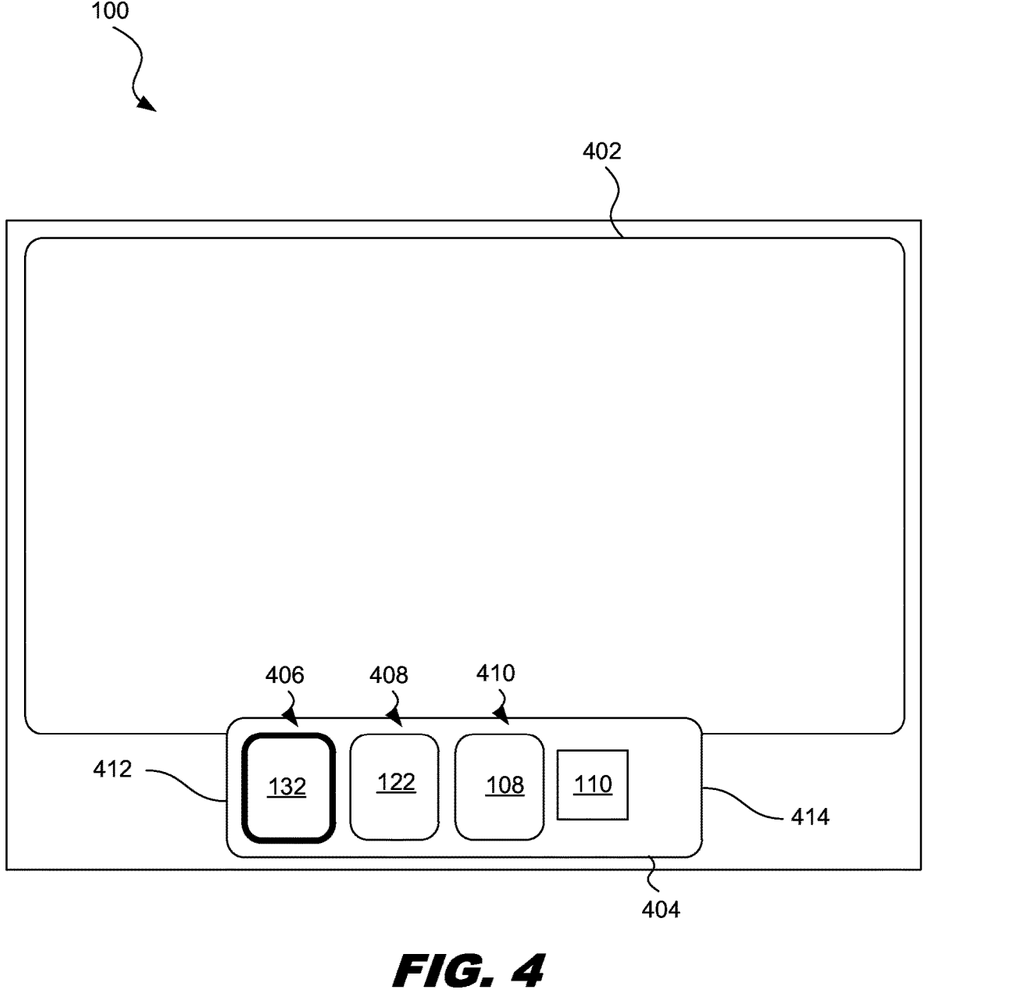
FIG. 4 is a diagram showing an illustrative horizontal workspace widget of a GUI, according to one example of principles described herein.

FIG. 4 is a diagram showing an illustrative horizontal workspace widget 404. In some examples, a user may choose to use a horizontal workspace widget 404 instead of a vertical workspace widget. According to the present example, the first position 406 is at the left side 412 of the workspace widget. The graphical object 132 in the first position 406 represents the present workspace 402. If a user provides input to the GUI 100 that indicates that he or she wishes to save the state of the workspace, the graphical object representing the present workspace is then pushed towards the right side 414 of the workspace widget into the second position 408.

As illustrated in FIG. 4, the graphical object 108 represents the first workspace which is now in the third position 410. The second graphical object 122 represents the second workspace and is now in the second position 408. The third graphical object 132 represents the new workspace 132 and is now in the first position 406. The button 110 that can be used to save the present workspace is to the right of the first graphical object 108.

Figure 5:
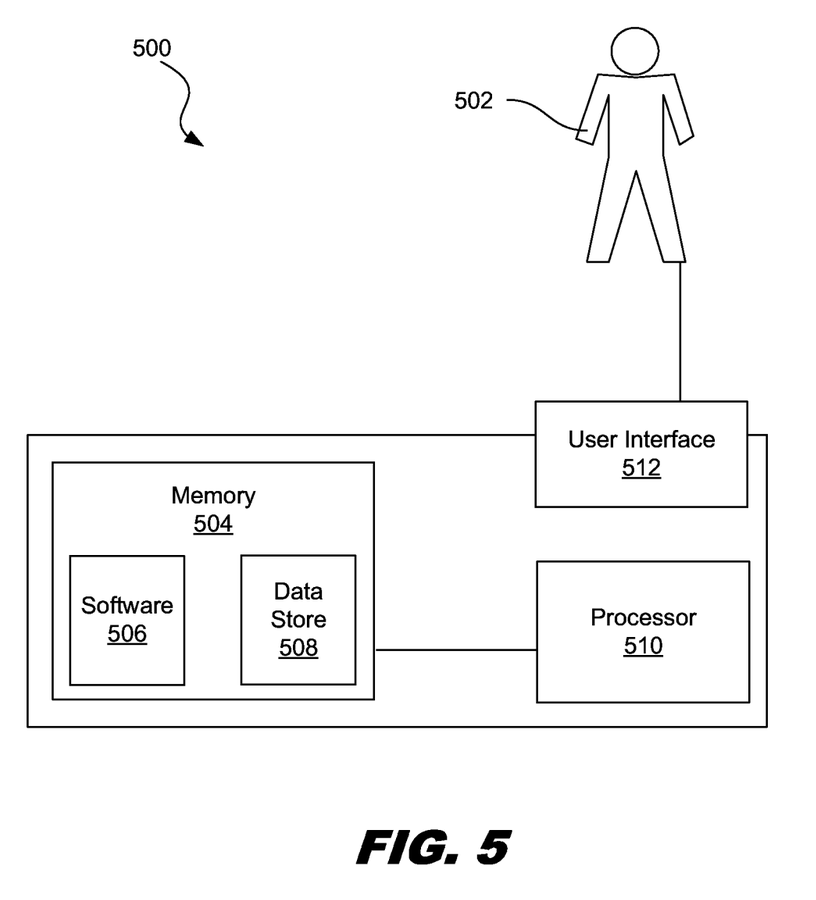
FIG. 5 is a diagram showing an illustrative computing system that can be used for workspace management, according to one example of principles described herein.

FIG. 5 is a diagram showing an illustrative computing system that can be used for workspace management. According to certain illustrative examples, the processing system 500 includes a memory 504 which may include software 506 and a data store 508. The processing system 500 also includes a processor 510 and a user interface 512.

The memory 504 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The processing system 500 also includes a processor 510 for executing the software 506 and using or updating the data 508 stored in memory 504. The software 506 may include an operating system and any other software associated with a GUI. The software 506 may include the tools described above in relation to workspace management. Specifically, the software 506 may include the appropriate machine readable instructions to provide the multiple-workspace environment and the workspace widget to manage that environment.

The user interface 512 may include a number of input devices such as a mouse, touchpad, or touchscreen that allow the user 502 to interact with a GUI. The user interface 512 may also include a number of different types of output devices such as a monitor or a touchscreen. The user interface allows the user 502 to interact with the processing system 500 in a manner as described above.

Figure 6:
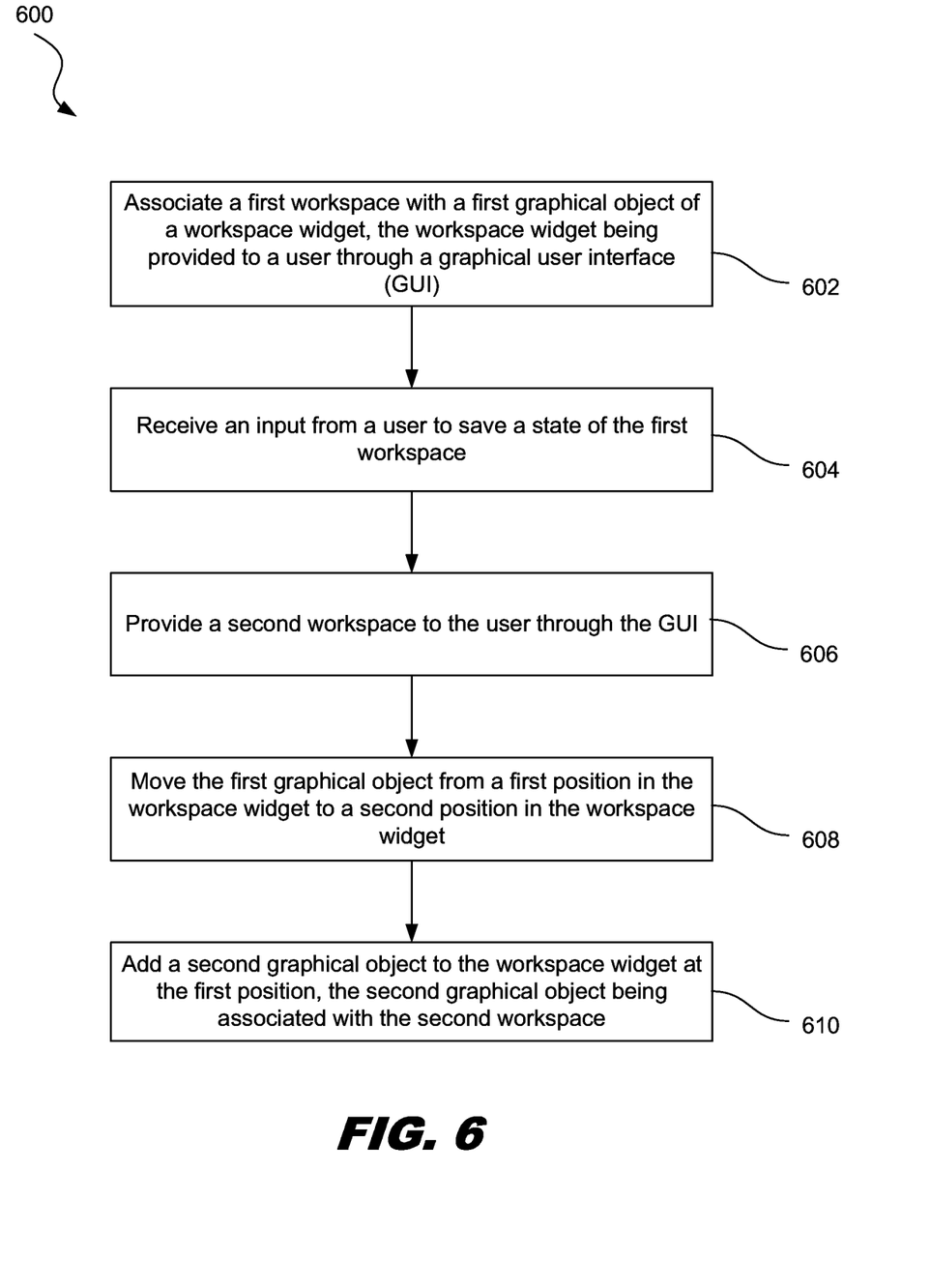
FIG. 6 is a flowchart showing an illustrative method for workspace management, according to one example of principles described herein.

FIG. 6 is a flowchart showing an illustrative method 600 for workspace management. According to certain illustrative examples, the method 600 includes associating 602 a first workspace with a first graphical object of a workspace widget, the workspace widget being provided to a user through a graphical user interface (GUI). The workspace widget may be either a vertical widget or a horizontal widget based on user preference. The first graphical object is in a first position, either at the top or left side of the workspace widget.

The method 600 further includes receiving 604 an input from a user to save a state of the first workspace. This input may be received through any type of input device with which the system that supports the GUI can accept. As described above, the user may click a button, make a hand gesture, or provide a voice command.

In some examples, when a user wishes to start a new workspace, the state of the present workspace is saved. Saving the state of the workspace may be done in a variety of manners. In one example, saving the state of the workspace means saving instances of the open applications within the present workspace. Additionally, the files associated with those applications are saved as is. The running instances of the application may remain in working memory and thus the applications are immediately available to the user when he or she switches back to the saved workspace. In some examples, however, the state of the applications, as well as any files associated with those applications, may be saved to a non-volatile memory store. When the user reopens that workspace, the state of the applications is reloaded into working memory.

In some examples, each of the applications within each workspace represented in the workspace widget is treated as an open application. When a user changes between different workspaces using the workspace widget, the only thing changing is what is visually presented to the user. Thus, the visual state of the applications of a current workspace is saved when the user switches to a different workspace. When the user switches back to the earlier saved workspace, the applications and files, which are in the state they were before the user left that workspace, are visually presented to the user as if the user had never left that workspace.

In some examples, the state of a workspace may be saved as a session. Computing systems will currently save a session when the user puts the computing system into a sleep mode or a hibernate mode. For example, when a user closes the screen on a laptop, the system will typically automatically go into a sleep mode. In that mode, the state of open applications on the system is saved as a session and put into a session file. The session file can then be placed into a non-volatile memory store. When the user wishes to switch back to that workspace, the session file can be reloaded into working memory.

The method 600 further includes providing 606 a second workspace to the user through the GUI. The second workspace may be initially blank. The user can open new applications for the workspace and arrange those applications as desired.

The method 600 further includes moving 608 the first graphical object from a first position in the workspace widget to a second position in the workspace widget. In the case of a vertical widget, the second position is immediately below the first position. In the case of a horizontal widget, the second position is to the right of the first position.

The method 600 further includes adding 610 a second graphical object to the workspace widget at the first position, the second graphical object being associated with the second workspace. Thus, the second graphical object is positioned where the first graphical object used to be positioned. This simulates a real environment where the oldest file would be positioned at the bottom of the stack while the newest file would be positioned at the top of the stack.

Some examples of systems and methods described herein may include non-transient, tangible, machine readable media that include executable code that when run by one or more processors (e.g., processor 410) may cause the one or more processors to perform the processes of method 500 as described above. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computer processing system, the method comprising:
   associating a first workspace with a first graphical object of a workspace widget, the workspace widget being provided to a user through a graphical user interface (GUI);
   receiving an input from a user to create a second workspace;
   providing the second workspace to the user through the GUI; and
   in response to creation of the second workspace:
      saving the first workspace, the saving including automatically generating a first workspace name and using the first workspace name for saving the first workspace, wherein the first workspace name is based on a history of workspace names provided by the user, wherein the workspace names provided by the user are for workspaces that are similar to the first workspace, wherein the first workspace name is further generated based on applications that are currently open within the first workspace;
      moving the first graphical object from a first position in the workspace widget to a second position in the workspace widget;
      adding a second graphical object to the workspace widget at the first position, the second graphical object being associated with the second workspace; and
      through the workspace widget, opening a first workspace menu from the first workspace, the first workspace menu providing at least one available action associated with the first workspace.

2. The method of claim 1, wherein the state of the first workspace includes a set of open applications.

3. The method of claim 2, wherein the state of the first workspace includes files associated with the applications.

4. The method of claim 1, wherein the workspace widget is a vertical widget and the second position is below the first position.

5. The method of claim 1, wherein the workspace widget is a horizontal widget and the second position is to a right of the first position from a perspective of the user.

6. The method of claim 1, further comprising, receiving an additional input from a user to save a state of the second workspace.

7. The method of claim 6, further comprising:
   moving the first graphical object from the second position to a third position;
   moving the second graphical object from the first position to the second position; and
   adding a third graphical object to the workspace widget at the first position.

8. The method of claim 7, further comprising, providing a third workspace to the user through the GUI, the third workspace being associated with the third graphical object.

9. The method of claim 1, wherein the first graphical object comprises a thumbnail image of the first workspace.

10. The method of claim 1, further comprising:
    associating a tag with the first workspace, the tag corresponding to a characteristic of the first workspace; and
    searching, based on the tag, a plurality of workspaces associated with graphical objects of the workspace widget.

11. The method of claim 1, further comprising, moving application objects between the first workspace and the second workspace through the workspace widget.

12. The method of claim 1, further comprising, sharing the first workspace with another computing system operated by a different user.

13. A method for workspace management, the method performed by a computer processing system, the method comprising:
    associating a first workspace with a first graphical object of a vertical workspace widget, the workspace widget being provided to a user through a graphical user interface (GUI);
    receiving an input from a user to save a state of the first workspace, the state including a set of open applications within the workspace, the state further including files associated with the open applications, the saving including automatically generating a first workspace name and using the first workspace name for saving the state of the first workspace, wherein the first workspace name is based on a history of workspace names provided by the user, wherein the workspace names provided by the user are for workspaces that are similar to the first workspace, wherein the first workspace name is further generated based on applications that are currently open within the first workspace;
    in response to the input, creating a new, second workspace to the user through the GUI; and
    in response to creating the new, second workspace:
       moving the first graphical object from a first position in the workspace widget to a second position in the workspace widget, the second position being below the first position;

adding a second graphical object to the workspace widget, the second graphical object being at the first position, the second graphical object being associated with the second workspace; and through the workspace widget, opening a first workspace menu from the first workspace, the first workspace menu providing at least one available action associated with the first workspace.

14. The method of claim 13, further comprising, receiving an additional input from a user to save a state of the second workspace;

moving the first graphical object from the second position to a third position;

moving the second graphical object from the first position to the second position; and adding a third graphical object to the workspace widget, the third graphical object being added at the first position.

15. A non-transitory machine-readable medium comprising machine readable instructions that when executed by one or more processors of a computing system, cause the one or more processors to:

associate a first workspace with a first graphical object of a workspace widget, the workspace widget being provided to a user through a graphical user interface (GUI);

receive an input from a user to create a second workspace;

provide the second workspace to the user through the GUI; and in response to creation of the second workspace:

saving the first workspace, the saving including automatically generating a first workspace name and using the first workspace name for saving the first workspace, wherein the first workspace name is based on a history of workspace names provided by the user, wherein the workspace names provided by the user are for workspaces that are similar to the first workspace, wherein the first workspace name is further generated based on applications that are currently open within the first workspace;

move the first graphical object from a first position in the workspace widget to a second position in the workspace widget;

add a second graphical object to the workspace widget at the first position, the second graphical object being associated with the second workspace; and through the workspace widget, opening a first workspace menu from the first workspace, the first workspace menu providing at least one available action associated with the first workspace.

16. The machine readable medium of claim 15, wherein the first graphical object comprises a thumbnail image of the first workspace.

17. The machine readable medium of claim 15, wherein the workspace widget is a vertical widget and the second position is below the first position.

* * * * *